United States Patent [19]
Fruntzek

[11] Patent Number: 4,702,685
[45] Date of Patent: Oct. 27, 1987

[54] ARRANGEMENT FOR FITTING A MOLD TOOL IN AN INJECTION MOLDING MACHINE

[75] Inventor: Peter Fruntzek, Götzenreuth, Fed. Rep. of Germany

[73] Assignee: Mannesmann Demag Kunststofftechnik, Schwaig, Fed. Rep. of Germany

[21] Appl. No.: 801,065

[22] Filed: Nov. 22, 1985

[30] Foreign Application Priority Data

Dec. 6, 1984 [DE] Fed. Rep. of Germany ....... 3444574
Jan. 14, 1985 [DE] Fed. Rep. of Germany ....... 3501000

[51] Int. Cl.⁴ ............................................. B29C 45/10
[52] U.S. Cl. .................................... 425/182; 425/186; 425/190; 425/556
[58] Field of Search ............... 425/182, 185, 186, 190, 425/192 R, 138, 150, 556

[56] References Cited

U.S. PATENT DOCUMENTS

| | | | |
|---|---|---|---|
| 4,231,987 | 11/1980 | Osawa et al. | 425/556 |
| 4,348,165 | 9/1982 | Vostrovsky | 425/192 R |
| 4,473,346 | 9/1984 | Hehl | 425/192 R |
| 4,500,274 | 2/1985 | Cyriax et al. | 425/185 |

FOREIGN PATENT DOCUMENTS

69919 1/1983 European Pat. Off. .
92686 2/1983 European Pat. Off. .

OTHER PUBLICATIONS

Article by: Von H. Diebel, "Produktionssteigerung beim SpritzgieBen durch Verringern der Maschinen-Stillstandzeiten" (Increasing Production in Injection Molding by Reducing Machine Down Times) in Kunststoffe 70, pp. 128–131 (1980).

Primary Examiner—Jay H. Woo
Assistant Examiner—Timothy W. Heitbrink
Attorney, Agent, or Firm—Hoffmann, Dilworth, Barrese & Baron

[57] ABSTRACT

An arrangement for fitting a mold tool in an injection molding machine which has first and second mold tool mounting plates, comprises an array of lower support arms on each plate for supporting the mold tool in a precisely aligned position in respect of height relative to the plate, lateral guides for aligning the mold tool in a lateral direction, clamping elements for fixing the portions of the mold tool on the respective plates, and connecting means on the mold tool and the machine for the supply to the mold of power, blowing air, a tool temperature control agent and the like. Each array of arms provides a guide surface extending perpendicularly away from the plate on which they are disposed, while the lateral guide means have guide surfaces which converge towards the respective plate and towards the center line thereof. The tool is displaceable towards the respective plates on the respective guide surfaces of the arrays of arms, by movement of the plates one towards the other. In such movement, the lateral guide surfaces co-operate with the lateral edges of the tool to provide precise alignment of the tool in a lateral direction. The arms of one array are laterally offset relative to the arms of the other array whereby the arms of each array can fit into the gaps between the arms of the opposite array when the mounting plates are brought together.

14 Claims, 8 Drawing Figures

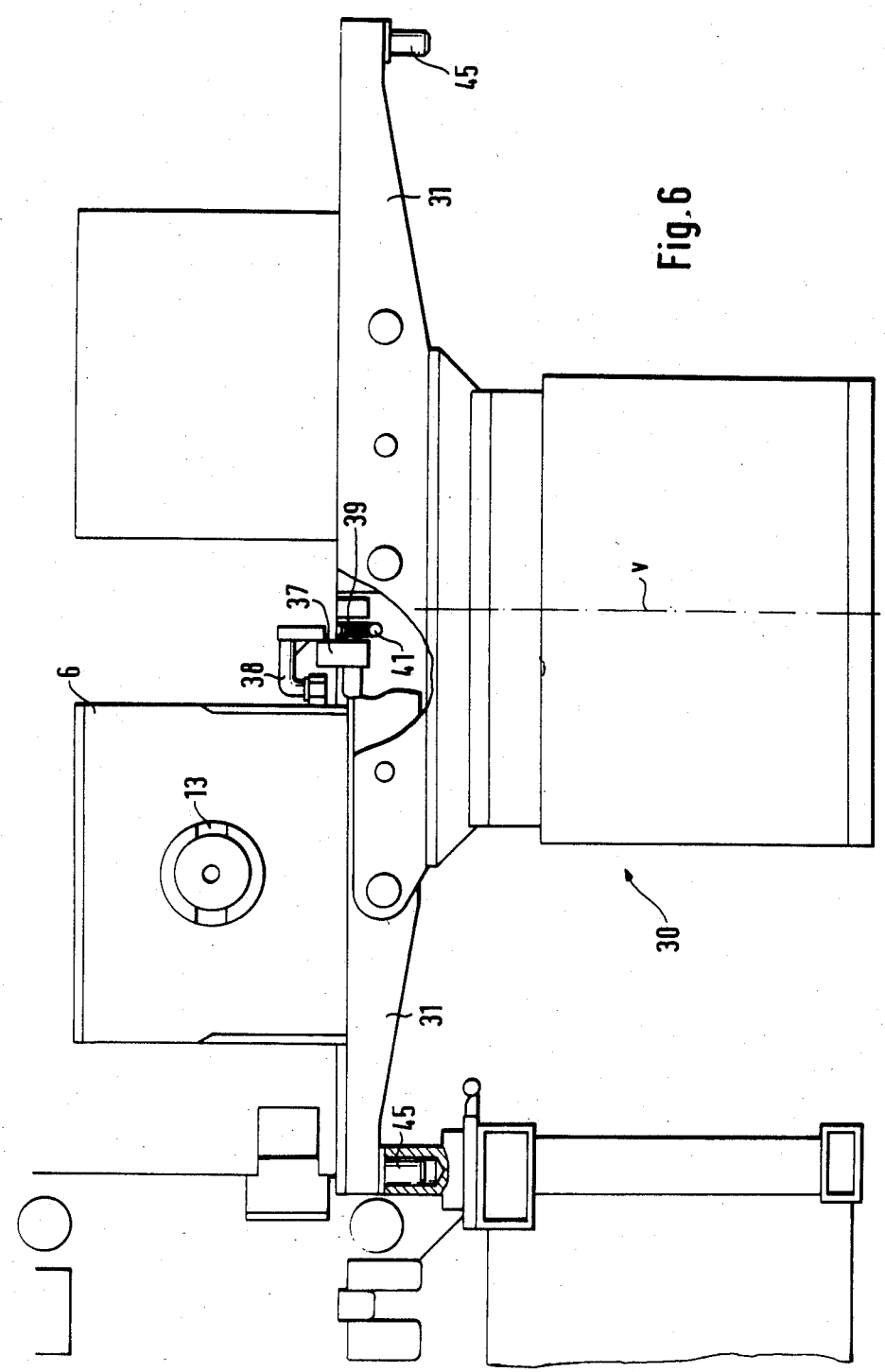

ARRANGEMENT FOR FITTING A MOLD TOOL IN AN INJECTION MOLDING MACHINE

BACKGROUND OF THE INVENTION

Injection molding machines may be of such a design that the molding tool used therein can be replaced and removed as required, for example for the purposes of a change of molding format. The machine may thus comprise mold tool mounting plates each carrying support means for supporting the mold tool in a condition of precise alignment in respect of height, together with lateral guide means on the mounting plates for precise alignment of the mold tool in the lateral direction. The two portions making up the mold tool may then be clamped to the respective mounting plates by suitable clamping elements, while the mold tool portions and the mounting plates of the machine comprise connecting blocks with connections for supplying for example power, a temperature control medium for the mold tool and the like. The connecting blocks can thus be coupled together in the course of the operation of fitting the mold tool into the machine.

In arrangements of the general kind just described above, which thus provide for quick change and quick fitting of the mold tool, as disclosed for example in the article entitled 'Produktionssteigerung beim Spritzgiessen durch Verringern der Maschinen-Stillstandzeiten' (Increasing production in injection molding by reducing machine down times), in Kunstoffe 70 (1980), pp. 128 to 131, and German laid-open application (DE-OS) No. 32 15 567, the bearing surfaces of the support means for aligning the mold tool in respect of height and the lateral guide surfaces are such that the tool must be in a substantially accurately aligned position with respect thereto, before it is inserted from above or from the side. The mold tool is moved within the guide arrangement formed by the support means and the lateral guide means, either by being lowered into position or by being pushed into position from the side, being displaced by means of a suitable drive arrangement in virtually parallel orientation with respect to the mold tool mounting plates. When the mold tool is fitted by being inserted from above, the movement for positioning the mold tool in the machine continues until the mold tool is resting on the support surfaces of the lower support means or, when the mold tool is fitted by being inserted from the side, the movement of the mold tool continues until it bears against an abutment which thus marks the correct position for the mold tool in the machine. After the mold tool has been fitted into its correct position in the machine, the high-speed clamping elements which are preferably actuated hydraulically are operated to engage projections provided on the sides of the mold tool, thereby to press the mold tool against the mounting plates of the machine. It will be appreciated that, in the course of the operation of moving the mold tool into position in the machine, the connections for temperature control medium, supply of power, blowing air and the like are also coupled together.

It will be appreciated that a necessary condition for effectively reducing the mold tool change times when using an arrangement as set forth above is that all the mold tools to be used, irrespective of their general format and size, must be of the same dimensions at their sides which are towards the mounting plates of the machine, so that, by virtue of the mold tool standing on the support surface of the lower support means and abutting laterally against the lateral guide means, the mold tool is positioned in the injection molding machine with the feedhead thereof being precisely aligned with respect to the feed duct in the mounting plate. That is advantageously achieved by virtue of an adaptor plate which is screwed on to the back of the mold tool, the clamping elements engaging over the adaptor plate when the mold tool is in the clamped position in the machine.

Although the above-discussed arrangement permits mold tools to be removed and replaced, for example for the purposes of changing the mold tool, in a relatively short period of time, the amount of time involved, particularly when handling large mold tools which may weigh several tons, is still quite substantial. This is because, in order to be able to move the mold tools into the guide arrangements provided on the mounting plates, the mold tool must be aligned with a very high degree of accuracy relative to the guides, before the movement of fitting the mold tool into the machine can be begun, and in addition the mold tool must be fitted into and removed from the machine with the utmost care in order to avoid damaging the guides and to prevent the mold tool from becoming jammed therein. As will be readily appreciated, that requires precision work on the part of the operating personnel, which is generally time-consuming. That is the more particularly where the mold tool is made up of two halves or portions which are fitted between the mounting plates jointly, that is to say, as an assembled mold tool, as in that case the mounting plates must also be moved apart precisely to the appropriate spacing to receive the mold tool therebetween.

SUMMARY OF THE INVENTION

An object of the present invention is to provide a mold tool fitting and clamping arrangement for an injection molding machine, which permits a mold tool to be easily and quickly fitted into position in the machine.

Another object of the invention is to provide a mold tool fitting and clamping arrangement on an injection molding machine, which is so designed as to reduce the period of time required for and the amount of work involved in a tool change operation.

Yet another object of the present invention is to provide a mold tool fitting and mounting arrangement in an injection molding machine, which permits a mold tool to be fitted into position between mounting plates of the machine without the need for the tool to be precisely aligned relative to the machine prior to the beginning of the operation of fitting the tool into position.

A still further object of the present invention is to provide a mold tool fitting and mounting arrangement in an injection molding machine, which provides for ready guidance of the tool on its being fitted into the machine.

Yet a further object of the present invention is to provide a mold tool mounting arrangement in an injection molding machine, which is of such a design as to afford greater simplicity in regard to insertion of the tool in the machine and a greater degree of versatility in the manner of performing a tool fitting operation.

These and other objects are achieved by a mold tool fitting and clamping arrangement in an injection molding machine which has mold tool mounting plates for mounting the mold tool in the machine, comprising support means on each of the mounting plates and extending substantially perpendicularly away therefrom, for supporting the mold tool portions in a condition of alignment with respect to the respective mounting plates, and lateral guide means on the respective mounting plates for precise lateral alignment of the mold tool relative to the respective mounting plates, the lateral guide means having guide surfaces which converge towards the respective mounting plate and towards the centre line of the mounting plates. The mold tool, resting on the support surfaces of the support means on the mounting plates of the machine, is displaceable towards the respective mounting plates, to permit it to be mounted thereon, by movement of the mounting plates towards each other, with the converging lateral guide surfaces of the lateral guide means co-operating with the side edges of the tool to provide for the precise lateral alignment thereof relative to the mounting plates. The arrangement further includes clamping means for securing the portions making up the mold tool to the respectively associated mounting plate, together with connecting means on the mold tool and on the machine, which are coupled together when the mold tool portions are fixed to the respective mounting plates, for the supply of power, temperature control agent, blowing air and the like.

With the above-defined arrangement in accordance with the principles of the present invention, by virtue of the fact that each support means on the mounting plates of the machine has a surface which extends perpendicularly away from the associated mounting plate, for guiding the mold tool and for permitting the mold tool to move thereon in relation to the mounting plate, together with the fact that the lateral guide surfaces extend inclinedly towards the centre line of the mounting plates, the mold tool can be set down on the lower support means at a spacing from the mounting plates, because the mold tool is subsequently moved towards the mounting plates to permit it to be secured thereto, by virtue of the mounting plates being moved towards each other. During that movement of the mold tool on the support means, the guide surfaces of the lateral guide means come to bear against the side edges of the tool and thus align the mold tool in a lateral direction so that, when it comes into its definitive contact with the respective mounting plates, the mold tool is precisely in the desired position relative thereto. To achieve that effect with the arrangement according to the invention, it is only necessary for the lower edges of the respective halves or portions that make up the mold tool, which lower edges may be for example the edges of the adaptor plates which are screwed to the backs of the mold tool portions as referred to above, to state on a respective lower support means on each mounting plate. There is no need for the two mounting plates of the machine to be disposed precisely at a given spacing from each other, for insertion of the mold tool therebetween, even when the tool is introduced into the machine with the two mold tool portions co-operating with each other in the mold-closed condition, which is the preferred method of fitting the mold tool into position.

If the mold tool is only to be lowered from above into position between the mounting plates, it is possible to provide mutually converging lateral guide surfaces in oppositely disposed relationship with respect to the centre line of the mold tool mounting plates of the machine. The converging lateral guide surfaces then move the tool into the correct position in a lateral respect, when the mounting plates are brought together. The tool is in the correct position in respect of height from the outset as the guide surface formed by the lower support means on the mounting plates is suitably adapted to that purpose. If, as is preferred, the mold tool is fitted into the machine from the side by a suitable piece of equipment which will be described in greater detail hereinafter, then lateral guide surfaces are provided only on the side of the mounting plates which is in opposite relationship to the side of the machine from which the mold tool is inserted. In that case, in the operation of inserting the mold tool into position, in the course of which the mold tool slides or rolls on the guide surface provided by the lower support means on the mounting plates, the above-mentioned lateral guide surfaces at the opposite side of the machine serve as an abutment to define the limit position in regard to the mold tool insertion movement.

Because the design of the arrangement in accordance with present invention permits the mold tool to be lowered on to the lower support means on the mounting plates or inserted into position therebetween, while the mounting plates are at a given spacing from each other, it is also possible for an ejector pin which generally projects out of the back of the movable mold tool portion to be provided on or left in position on the mold tool; when, after the mold tool has been fitted into position between the spaced-apart mounting plates, the mounting plates are then moved towards each other, the ejector pin engages into a suitable bore for receiving same in the associated mounting plate and can then be automatically coupled to an ejector mechanism. In the above-discussed prior-art arrangements in which the mounting plates, during the operation of inserting the mold tool therebetween, are disposed virtually in the positions that they will occupy when the mold tool portions are operatively clamped thereto, with the mold tool in the closed condition, it was not possible for the ejector pin to be mounted on the mold tool prior to the operation of fitting it into position, as the fact that the ejector pin protects from the back of one of the mold tool portions would block the movement of the mold tool into position between the mounting plates. It was therefore necessary for the ejector pin to be inserted and operatively coupled to the remainder of the ejector mechanism, after the mold had been fixed to the mounting plates.

In an embodiment of the present invention, each of the support means on the respective mold tool mounting plates may be formed by a plurality of arms which extend away from the respective mold tool mounting plate in juxtaposed parallel relationship with each other, thereby forming gaps between adjacent arms. The arms forming the support means on the one mounting plate are arranged in a displaced relationship with respect to the arms forming the support means on the other mounting plate whereby the arms on the one mounting plate are aligned with the gaps between the arms of the other mounting plate. In that way it is possible for the support and guide surfaces afforded by the support means on the mounting plates to be relatively wide as measured in a direction perpendicular to the respective mounting plate, in other words, the arms forming the respective support means may extend away from the respective mounting plate by a fairly substantial distance. That in turn permits the mounting plates to be moved relatively far apart for the operation of inserting the mold tool therebetween, which further facilitates the tool removal and fitting operations. In an advantageous development of that construction, the support means on the mounting plate with which the abovementioned ejector mechanism is associated may be wider in a direction perpendicular to the mold tool mounting plate, to take account of the fact that, because of the ejector pin projecting out of the associated mold tool portion, the back of that mold tool portion must be disposed at a greater spacing from the respectively associated mounting plate, than the back of the other mold tool portion from its associated mounting plate.

The movement for centering the mold tool, which takes place when the mounting plates are moved towards each other, is further promoted if at least one mold tool portion is provided with additional centering means adapted to co-operate with a centering opening in the operatively associated mounting plate. The additional centering means may be for example circular ring segments which are disposed in diametrally opposite relationship with respect to the centering opening in the mounting plate (as disclosed in German laid-open application (DE-OS) No. 29 38 665), the free edges of the segments, at the outside thereof, having taper surfaces which are adapted to co-operate with the edge of the centering opening in the mounting plate, to facilitate guiding the centering means into the centering opening.

It follows from the nature of the operation of aligning the mold tool with respect to its mounting plates that the coupling means of the connections provided in the connecting means for supplying power, blowing air, temperature control agent and the like to the mold tool face towards the mounting plates as they come into engagement with the corresponding coupling means on the mounting plates, towards the end of the operation of moving the mounting plates towards each other and thus bringing them into operative contact with the mold tool disposed therebetween. For that purpose, the connecting means on the mold tool are disposed at an edge thereof, advantageously on the adaptor plate which is secured to the back of each mold tool portion, while the connections on the mold tool face towards the respectively associated mounting plate.

In accordance with a further development of the teachings of the present invention, there is also included a tool carriage or truck for introducing the mold tool into the injection molding machine from the side thereof. The tool carriage has a surface for supporting the mold tool during displacement thereof, and a means for pushing the mold tool into position between the mounting plates of the injection molding machine from the side thereof. The support surface for the tool is formed in accordance with the invention by two mutually parallel rails or bars which are associated with the edges of the mold tool, for example the edges of the adaptor plates thereon, one of the rails being stationary while the other is displaceable relative thereto in a direction which is transverse with respect to the longitudinal direction of the rail. In that way, mold tools of different widths can be readily accommodated on the carriage. With that arrangement, the stationary rail serves as a point of orientation in regard to positioning of the carriage relative to the injection molding machine, for example in such a fashion that the stationary rail is always associated with the stationary mounting plate which is disposed at the injection feed side of the machine. Therefore, without meeting high requirements in respect of accuracy of positioning, the stationary rail of the carriage can be aligned with the support means carried by the stationary mold tool mounting plate so that, with the means for pushing the mold tool from the carriage into position between the mounting plates of the injection molding machine, the mold tool is properly pushed on to the corresponding support means on the mounting plate.

Further objects, features and advantages of an arrangement in accordance with the present invention will be apparent from the following description of a preferred embodiment thereof.

BRIEF DESCRIPTION OF THE DRAWINGS

FIG. 6 is a view of part of the construction shown in FIG. 1, on an enlarged scale, showing details of the mold tool and the tool carriage;

DESCRIPTION OF THE PREFERRED EMBODIMENT

Figure 3:
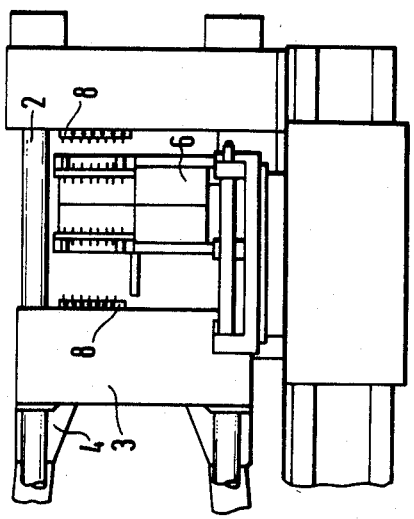
FIG. 3 is a side view of part of the injection molding machine viewing in the direction indicated by X in FIG. 1, illustrating only one mold tool.

Referring now to the drawings, shown therein is an injection molding machine which however may be of any appropriate kind. The injection molding machine illustrated herein by way of example is a machine having a stationary mold tool portion mounting plate 1 at the injection feed side of the machine and a second mold tool portion mounting plate 3 which is longitudinally displaceable on suitable bearers as indicated at 2 and which is actuable by a bell crank mechanism which is only diagrammatically indicated at 4 in FIG. 3. The mounting plate 3 can thus be displaced towards the right in FIG. 3 for example, to move it towards the stationary mounting plate 1. Further details and features of the construction of the injection molding machine are not illustrated in the drawings or described herein as such detail features follow generally conventional practice.

Figure 1:
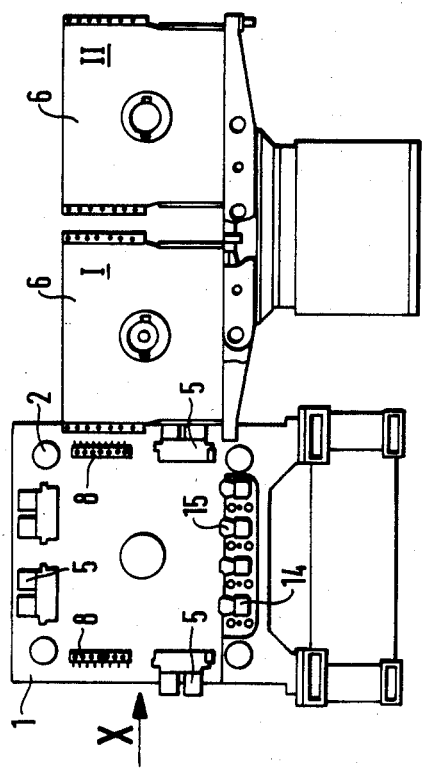
FIG. 1 shows a front view of the stationary mold tool mounting plate at the injection feed side of the injection molding machine, as viewed from the position of the other mounting plate of the machine, together with a side view of a tool carriage in position for a tool change operation.

Carried on the respective mounting plates 1 and 3 are clamping elements 5 which may be for example hydraulically actuable and which constitute high-speed clamping means for clamping the respective mold tool portions in position on the respective mounting plates 1 and 3. The clamping elements 5 are operatively associated with three edges of the respective mold tool portions forming the mold tool 6 of which two are shown in FIG. 1, the clamping elements 5 thus being associated with the two lateral edges or sides and the upper edge of the tool 6. Carried on the respective mounting plates 1 and 3 in the vicinity of the two oppositely disposed side edges thereof are connecting means or connecting blocks 8 to which pass conduits 9 for various feeds to the mold tool 6, for example electrical power, blowing air, a temperature control agent and the like. The connections afforded by the connecting blocks 8 are normally closed and they can be opened by automatically operative coupling means when the corresponding connections on the mold tool portions are inserted into the connecting blocks 8. The above-defined connecting means follow generally conventional practice, as disclosed for example in German laid open application (DE-OS) No. 31 27 797 to which reference should therefore be made.

Figure 4:
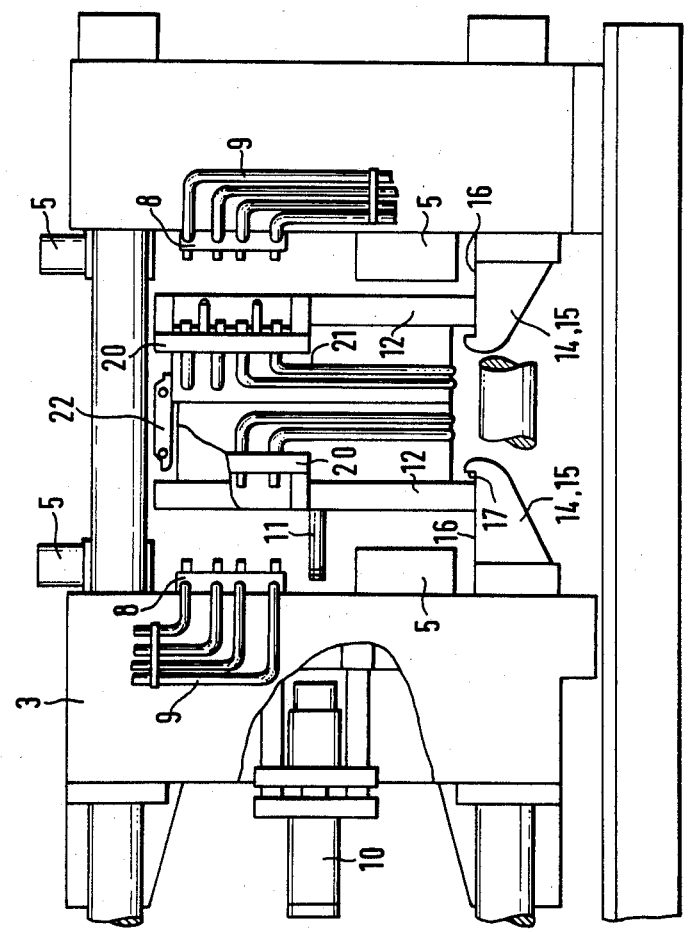
FIG. 4 is a side view, corresponding to that shown in FIG. 3, of part of the injection molding machine on an enlarged scale, without the tool carriage and with the mold tool in the position of being inserted between the mounting plates of the machine.

Disposed in the movable mounting plate 3 is a hydraulically actuable ejector mechanism 10 of conventional kind, which can be coupled to an ejector pin indicated at 11 in FIG. 4 on the tool 6.

Each mold tool 6 comprises two mold tool halves or portions, each of which carries an adaptor plate 12 at the back thereof. The dimensions of the adaptor plates 12 are the same on each mold tool 6.

Figure 2:
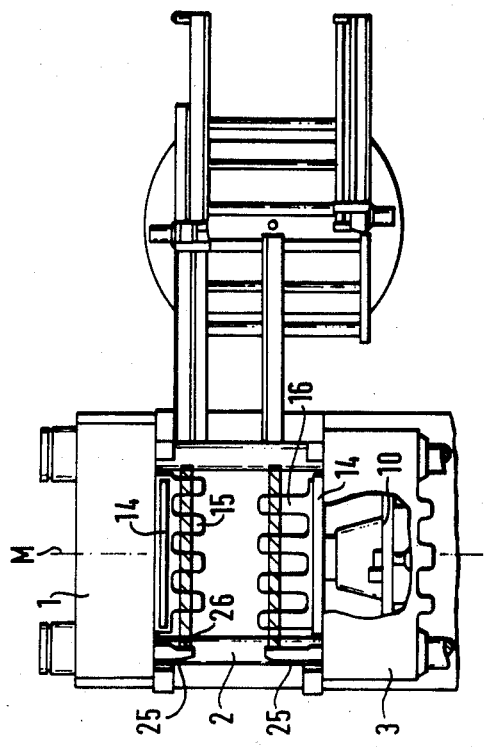
FIG. 2 is a plan view of part of the injection molding machine and the tool carriage of FIG. 1, but without showing the mold tools illustrated therein.

Fixed to each of the two mounting plates 1 and 3, approximately at the same level at the lower guide members 2, are respective support means indicated generally at 14 in for example FIGS. 1 and 2. The support means 14 on each mounting plate 1 and 3 are of a bracket-like cantilever configuration extending perpendicularly away from the associated mounting plate 1 and 3, as can be clearly seen from FIGS. 4 and 5. Each support means 14 in the illustrated embodiment comprises four arms 15 which thus extend away from the associated mounting plates 1 and 3. The configuration of the arms 15 can be clearly seen from the plan view of FIG. 2. On its top, each of the arms 15 provides a flat horizontal guide surface 16, with all the surfaces 16 of the arms 15 being disposed in a common plane and jointly forming a surface for supporting and guiding a mold tool 6 thereon. In the vicinity of the free end of each of the arms 15, each surface 16 thereof is delimited by an upwardly extending shoulder 17 to act as an end abutment to prevent a mold tool portion carried thereon from slipping off the end of the support means 14 on which it is disposed.

As can be seen for example from the plan view in FIG. 2, the arms 15 of each support means 14 are disposed in parallel relationship and thus form gaps therebetween. It will be clearly seen from FIG. 2 that the arms 15 on the stationary mounting plate 1, which is the upper plate as viewing in FIG. 2, are arranged in displaced relationship in a transverse direction with respect to the arms 15 on the movable mounting plate 3 so that the arms 15 on one mounting plate are aligned with the gaps between the arms 15 on the other mounting plate. Thus, when the movable mounting plate 3 is moved towards the stationary mounting plate 1, the arms 15 on each mounting plate can engage into the gaps between the arms 15 on the opposite mounting plate.

It will further be seen from FIG. 2 that the arms 15 of the movable mounting plate 3 are longer than the arms on the stationary mounting plate 1, so that the mold tool guide surface provided by the top surfaces 16 of the arms 15 on the movable mounting plate 3 is wider, as measured in a direction perpendicular to the mounting plate 3, than the tool guide surface provided by the top surfaces 16 of the arms 15 on the stationary mounting plate 1, for reasons that will become apparent hereinafter.

Figure 5:
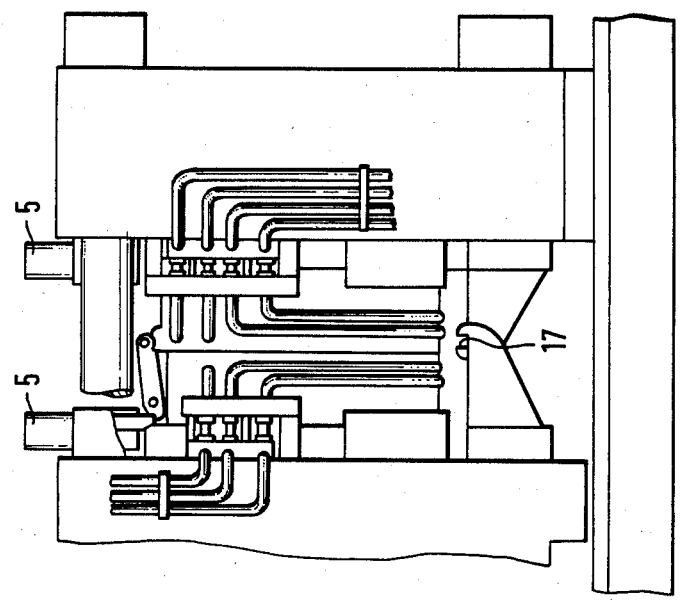
FIG. 5 is a side view corresponding to that shown in FIG. 4, illustrating the injection molding machine with the mounting plates in the condition in which they are moved together and in which the mold tool is positioned and clamped thereto.

As can be seen from FIG. 3 and even more clearly from FIGS. 4 and 5, disposed at opposite side edges of the mold tool 6 are connecting means in the form of connecting blocks 20, from which conduits 21 lead into the interior of the mold tool 6. The connecting ends of the connections in the connecting blocks 20 face rearwardly with respect to the backs of the respective mold tool portions, that is to say, when the tool 6 is in the condition of being inserted between the mounting plates 1 and 3, the connecting ends of the connections of the connecting blocks 20 face towards the associated mounting plate 1 or 3. In FIGS. 4 and 5, the mold tool portions are in a closed condition so that the mold tool portions are thus moved and handled as a single unit, with the mold tool portions being locked together by a locking lever as diagrammatically indicated at 22, for the period of time during which the mold tool change and clamping operation is effected.

Referring now to FIG. 2, carried on the mounting plates 1 and 3 at the side thereof which is in opposite relationship to the side from which a mold tool 6 is inserted are lateral guides 25 having lateral guide surfaces indicated at 26, which face towards the centre line M of the mounting plates 1 and 3. As considered in a direction from the free end of the respective lateral guides 25 towards the respective mounting plate 1 or 3, the lateral guide surfaces 26 initially extend at least substantially perpendicularly to the respective mounting plates 1 and 3. However, at a certain distance from the free end of each lateral guide 25, the lateral guide surfaces 26 provide an inclined surface portion which extends towards the respective mounting plate 1 or 3 in convergent relationship with respect to the centre line M of the mounting plates 1 and 3. The inclined surface portion referred to above is then followed, in a direction towards the face of the respective mounting plate, by a surface portion which is at least substantially parallel to the centre line M. All the above-mentioned lateral guide surfaces 26 including the inclined surface portion of each thereof are perpendicular to the guide surface 16 defined by the respective support means 14.

It will also be seen from FIG. 2 that the lateral guide 25 on the movable mounting plate 3 is longer than the oppositely disposed lateral guide 25 on the stationary mounting plate 1, in the same manner as the arms 15 on the movable mounting plate are longer than the arms 15 on the stationary mounting plate 1.

For the purposes of transporting and inserting a mold tool 6 into the injection molding machine, there is provided a tool carriage or truck which is generally denoted by reference numeral 30 in FIG. 6 and which can be seen in its operative association with the injection molding machine in FIGS. 1 through 3. The tool carriage 30 is movable for example on rollers along an induction track which is not shown herein. The carriage 30 comprises a support structure which is suitable for carrying two mold tools 6, as can be seen from FIG. 1. The support structure is formed by respective pairs of rails 31 and 32 which extend outwardly on oppositely disposed sides of the carriage 30, as can be clearly seen for example from the plan view in FIG. 7. The one rail 31 is stationary relative to the body of the carriage 30 while the other rail 32 is movable relative thereto in a transverse direction with respect to its longitudinal direction. The rails are carried on a frame indicated at 33 in FIG. 7 and comprising cylindrical frame members 34. In addition, a screwthreaded spindle 35 is mounted rotatably on the frame 33, in parallel relationship to the frame members 34. A further screwthreaded spindle 36 is also rotatably carried by the stationary rail 31 in parallel relationship thereto, as can be clearly seen also from FIG. 7. The screwthreaded spindle 36 is in screw engagement with a displacement block or member 37 with an arm 38 carried thereon, as can be seen from FIG. 6. The screwthreaded spindle 36 further carries a worm gear 39 which can be caused to rotate by a worm 41 driven by a motor 40. The screwthreaded spindle 35 can also be driven in a similar fashion which however is not illustrated in detail herein, in order thereby to adjust the mutual spacing of the rails 31 and 32 to the distance required by the respective mold tool 6 to be carried thereby.

Figure 7:
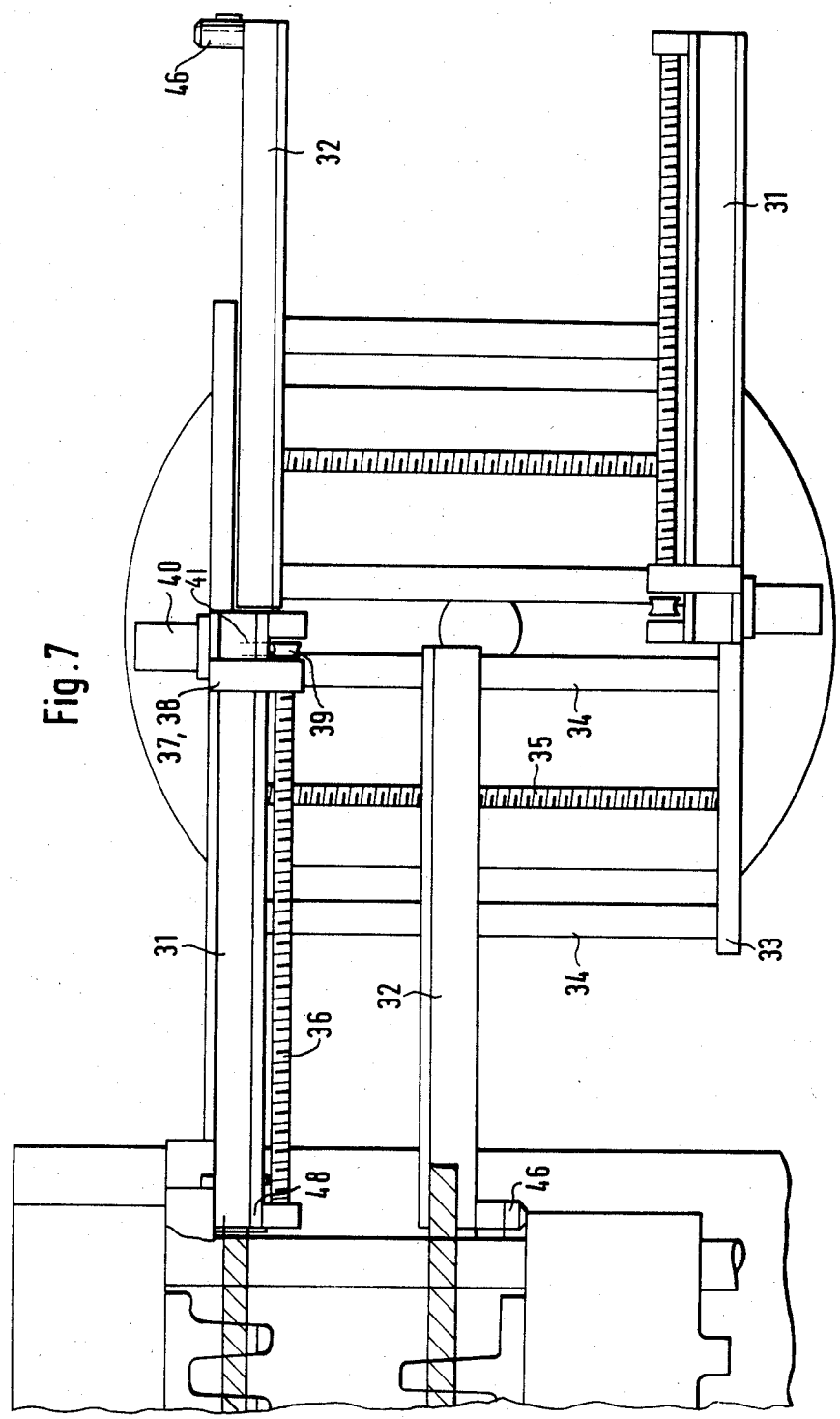
FIG. 7 is a plan view corresponding to the view shown in FIG. 2 and illustrating the tool carriage, on an enlarged scale.

Referring to FIGS. 6 and 7, indicated at the free ends of the rails 31 and 32 are centering and support elements 45 and 46 of which the downwardly projecting element 45 shown in FIG. 6 can engage into a corresponding centering opening 48 on the injection molding machine, while the other element 46 which protects laterally from the rail, as shown in FIG. 7, serves essentially only for providing a support and bearing action against a suitable surface on the injection molding machine. For the purposes of docking the free ends of the rails 31 and 32 at the corresponding locations on the injection molding machine, the structure of the carriage 30, carrying the frame 33, can be moved backwards and forwards by a certain distance in the longitudinal direction of the rails 31 and 32 by means which are not shown in the drawings, being for example and preferably hydraulic means. In addition, the above-mentioned support structure of the carriage 30 is pivotable through 180° about a vertical axis as indicated at V in FIG. 6, also by means of a mechanism which is not shown herein, so that the one pair or the other of the rails 31 and 32 may be directed towards the injection molding machine as required.

Figure 8:
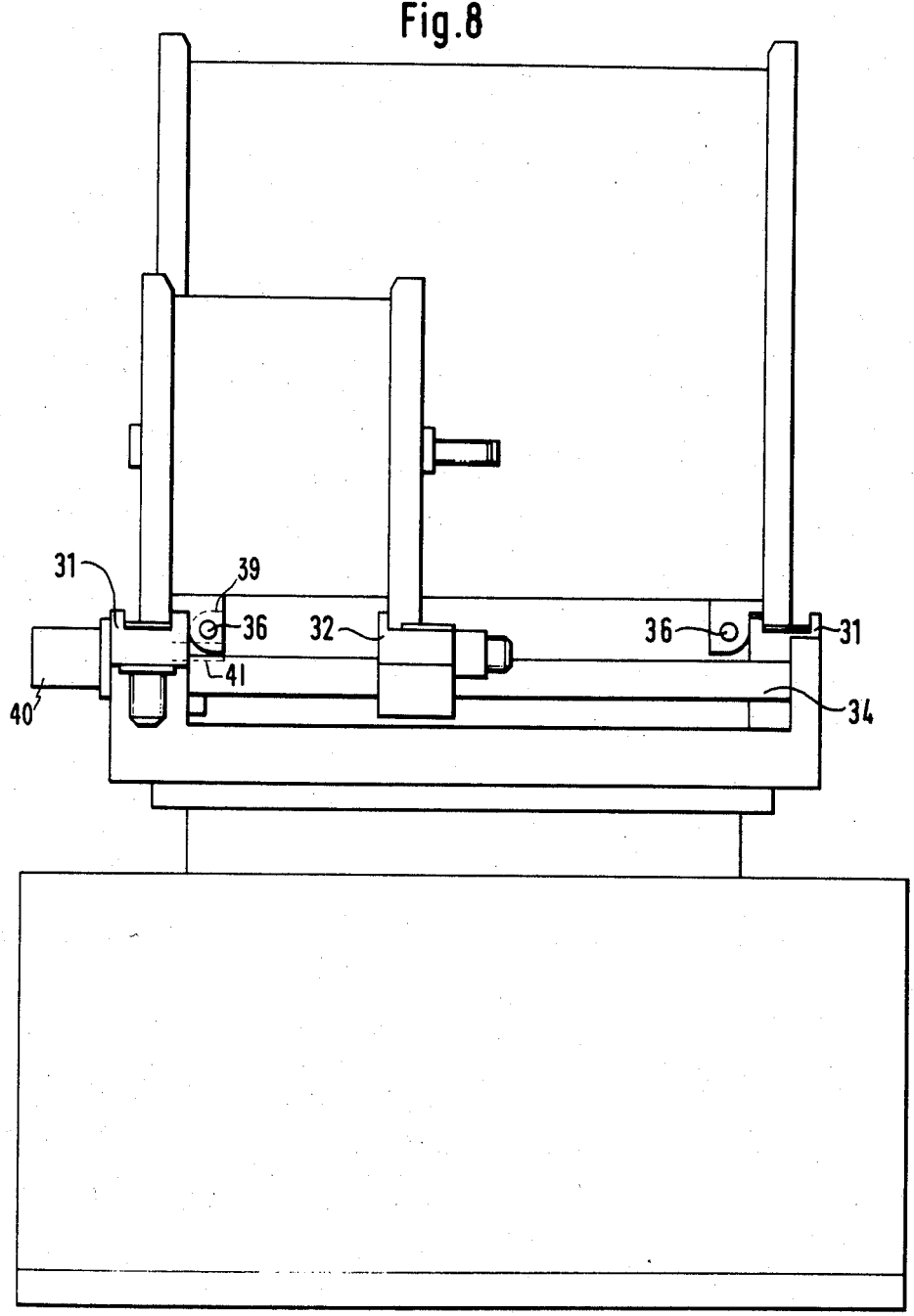
FIG. 8 is a view corresponding to that shown in FIG. 3 of part of the assembly, showing the tool carriage, on an enlarged scale.

Referring now to FIG. 8, the stationary rails 31 are of a generally U-shaped cross-sectional configuration in which the lower edge of the respective adaptor plates on the mold tool 6 can slide, while the movable rails 32 are of a generally L-shaped cross-sectional configuration. The rails 31 and 32 and possibly also the guide surfaces 16 provided by the support means 14 on the respective mounting plates 1 and 3 may be coated with a friction-reducing low-wear slip coating to facilitate the sliding movement of the mold tool portions thereon.

Having described the structure and configuration of the arrangement in accordance with the present invention, the mode of operation thereof will now be described:

From a central control system for the injection molding machine or possibly an entire array of such machines, the carriage 30 receives an instruction for replacement of a mold tool at a given injection molding machine to befitted with another mold tool. In consideration of that instruction, the carriage 30 moves under program control to a mold tool store where a fresh mold tool 6 is put on to the rails 31 and 32 either manually or automatically. Then, the carriage 30 goes to the corresponding injection molding machine at which the new mold tool 6 carried thereby is required and docks with the centering and support elements 45 and 46 at the corresponding locations on the injection molding machine. In this phase of operation, the new mold tool (as indicated at II in FIG. 1) is disposed on the pair of rails 31 and 32 which are remote from the injection molding machine. The movable block 37 on the rail 31 of the empty pair of rails 31 and 32 is advanced by actuation of the motor 40 to the end of the rail 31 which is towards the injection molding machine so that the arm 38, by means of gripper elements which are not illustrated herein, can engage into and become positively locked in corresponding lateral eyes or grooves (not shown) on the mold tool 6 in the injection molding machine. The clamping elements 5 then release the mold tool 6 which is in the machine and the mounting plates 1 and 3 are moved apart by displacement of the movable mounting plate 3. While the mounting plate 3 is moving away from the mounting plate 1, the lower edges of the adaptor plates 12 of the two mold tool portions in the machine slide on the associated guide and support surfaces 16 until the lower edges of the adaptor plates 12 come to bear against the shoulders 17 on the arms 15 making up the respective support means 14 and, in the course of the further movement of the mounting plate 3 away from the mounting plate 1, the tool is thus pulled into a position in which it is disposed at such a spacing from the stationary mounting plate 1 that the adaptor plate thereof, which is towards the stationary mounting plate 1, is aligned with the rail 31. In that position, the ejector pin 11 is also completely released from the movable mounting plate 3. By further slight movement of the mounting plate 3, for example by a millimetre, the adaptor plates which until that time were in a condition of bearing hard against the shoulders 17 are released therefrom so that the mold tool (indicated at I in FIG. 1) can now be pulled out of the space between the mounting plates 1 and 3 and on to the rails 31 and 32, by actuating the motor 40 in the appropriate direction. When that mold tool 6 has been completely removed from the injection molding machine, the support structure of the carriage 30 is suitably actuated to cause the elements 45 and 46 to move out of the corresponding docking locations on the injection molding machine, and the support structure is then pivoted through 180° about the vertical axis V in FIG. 6 so that the new mold tool passes into the position for installation thereof into the injection molding machine and the centering and support elements 45 and 46 of the pair of rails 31 and 32 carrying the new mold tool can move into docking engagement. In that phase of operation, the stationary rail 31, also under program control, is disposed at a location relative to the injection molding machine in which that rail is aligned with the guide surface 16 formed by the arms 15 on the stationary mounting plate 1. The motor 40 is now actuated so that the block 37 and the arm 38 carried thereon push the mold tool 6 in parallel relationship to the mounting plates 1 and 3 on to the guide surfaces 16 afforded by the arms 15 of the support means 14 on the respective mounting plates. Before that, the mounting plates 1 and 3 have been spaced apart to such a distance that it is certain that the tool 6 can be moved without hindrance into position between the mounting plates, even having regard to the rearwardly projecting ejector pin 11 carried by the mold tool. As indicated above, there is in that respect no need for adjusting the spacing between the mounting plates with a particular degree of accuracy as it is only necessary to ensure that the lower edges of the adaptor plates 12 of the mold tool pass on to the guide surfaces 16 of the arms 15 and the ejector pin 11 does not strike against the movable mounting plate 3. The mold tool 6 is then pushed into position between the mounting plates 1 and 3 until the lateral edges of the adaptor plates 12, or one thereof, which are the leading edges or edge in the direction of insertion movement of the mold tool, comes to bear against the guide surface 26 of the lateral guides 25, or one thereof. Actuation of the motor 40 is then stopped, which can be effected under the control of suitable limit switches (not shown) or by way of the current draw of the motor 40. As the mounting plates 1 and 3 are at a corresponding spacing from each other, abundant of the mold tool 6 against the guide surfaces 26 of the lateral guide members 25 will generally occur at the parts of the guide surfaces 26 that are oriented parpendicularly to the respective mounting plates 1 and 3. It will be appreciated that, in that position, the mold tool 6 is properly positioned in respect of height, by virtue of the precise positioning of the guide surfaces 16 on which the mold tool 6 is supported, but the mold tool is not properly positioned also in a lateral direction. Now however, also under program control, the spacing between the mounting plates 1 and 3 is reduced by movement of the mounting plate 3 towards the mounting plate 1. During that movement, the tool 6 slides on the guide surface 16 provided by the arms 15 of at least one of the support means 14 carried by the respective mounting plates 1 and 3, and is thus moved towards the respective mounting plates. During that movement which is parallel to the centre line M of the mounting plates, as shown in FIG. 2, the lateral edges of the adaptor plates 12 above against the inclined portions of the lateral guide surfaces 26 so that, as a result thereof, the mold tool 6 is also displaced transversely with respect to the centre line M on the guide surfaces 16 until the mold tool is in the proper precisely aligned position in relation to the mounting plates. During the last part of the movement of the mounting plate 3, centering elements which are disposed at least at the injection opening of the mold tool 6, being in the form of circular ring segments as indicated at 13 in FIG. 6, engage into a centering bore in the stationary mounting plate 1 and promote lateral alignment of the mold tool relative to the mounting plates. When both adaptor plates 12 on the mold tool 6 are in a condition of bearing firmly against the respectively associated mounting plates, the clamping elements 5 are controlled to move into their operative position and press against the mold tool, thereby fixing it to the respective mounting plates.

While the mounting plate 3 is moving towards the mounting plate 1, the ejector pin 11 is also engaged into the associated bore in the movable mounting plate 3. At the end of the movement, the ejector pin 11 reaches an automatic coupling on the ejector mechanism 10, which for that purpose has been preset into a ready-for-coupling position. Coupling arrangements of that kind are conventional and do not therefore need to be described in greater detail herein (one form of such a coupling arrangement is that known as the HASCO coupling arrangement from the company HASCO-NCRMA-LIEN HASENCLEVER & Co of 5880 Lüdenscheid in the Federal Republic of Germany). At the end of the closing movement of the mounting plates 1 and 3, the arms 15 of the support means 14 on the respective mounting plates have also engaged into the gaps between the respectively opposite arms 15, in the manner shown in FIG. 5, and likewise, the coupling means on the connecting blocks 20 on the mold tool have come into contact with the coupling means of the connecting blocks 8 on the machine, and the corresponding comunications between the conduits 9 and 21 have thus been made. It will be seen from FIG. 5 that actuation of the upper clamping element 5 on the movable mounting plate 3 causes the locking lever 22 to be pivoted out of its locking position so that the two halves making up the mold tool 6 are now unlocked from each other. The tool change operation is thus completed and the injection molding machine is again ready for operation.

It will be appreciated that the above-described construction has been set forth only by way of example of the principles of the present invention and that various modifications and alterations may be made therein without thereby departing from the spirit and scope of the present invention.

What is claimed is:

1. In an injection molding machine having first and second mounting plates of which at least one said mounting plate is movable relative to the other said mounting plate, for carrying respective portions of a mold tool, a mold tool fitting arrangement which comprises:
   a respective support means on each said mounting plate and having a guide surface extending perpendicularly away from said mounting plate, for supporting said mold tool in a condition of precise alignment in respect of height relative to said mounting plate, said support means on each said mounting plate comprising
   a plurality of arms positioned to extend away from the respective said mounting plate in juxtaposed parallel relationship to each other, said arms on each mounting plate being arranged in displaced relationship to the arms on the other mounting plate whereby when said mounting plates are in a position of being brought towards each other, said arms on each mounting plate extendable into gaps formed between said arms on the other oppositely disposed mounting plate;
   lateral guide means on said mounting plates for lateral alignment of said mold tool, said lateral guide means having guide surfaces which converge towards the respective mounting plate and towards a centre line thereof and which are adapted to co-operate with side edges of the mold tool whereby, when said movable mounting plate is moved from a spaced-apart condition of said mounting plates for freely receiving said mold tool therebetween towards the other mounting plate, each said mold tool portion is displaceable on said respective guide surface of said support means towards said respective mounting plate with said lateral guide surfaces providing for precise lateral alignment of said mold tool portions with said mounting plates;
   means for fixing said respective mold tool portions on said respective mounting plates; and
   connector means on said mold tool a said machine, said connector means on said mold tool and said connector means on said machine adapted to be coupled together in the operation of fitting said mold tool on said machine, to provide operational communication between said mold tool and said machine.

2. An arrangement as set forth in claim 1 further including an abutment means on each said support means.

3. An arrangement as set forth in claim 2, wherein each said abutment means comprises a shoulder configuration on each said support means.

4. An arrangement as set forth in claim 1 wherein at least one said tool portion has centering means adapted to co-operate with a centering opening in the respectively associated mounting plate.

5. An arrangement as set forth in claim 4 wherein said centering means comprises circular ring segments in diametrally opposite relationship with respect to said centering opening.

6. An arrangement as set forth in claim 1 wherein said connector means on said mold tool are arranged at at least one edge of said mold tool and the connectors thereof are oriented in the direction of movement of the movable mounting plate.

7. An arrangement as set forth in claim 1 wherein an ejector mechanism is disposed on a said movable mounting plate and an ejector pin is disposed on the respectively associated mold tool portion, said ejector mechanism and said ejector pin being adpated to be coupled together when said mold tool portion and said mounting plate are brought towards each other.

8. An arrangement as set forth in claim 7 wherein said guide surface of said support means disposed on said movable mounting plate as measured in the direction of movement of said mounting plate is longer than that of the oppositely disposed support means on the other mounting plate.

9. In an injection molding machine having first and second mounting plates of which at least one said mounting plate is movable relative to the other said mounting plate, for carrying respective portions of a mold tool, a mold tool fitting arrangement which comprises:

a respective support means on each said mounting plate and having a guide surface extending perpendicularly away from said mounting plate, for supporting said mold tool in a condition of precise alignment in respect of height relative to said mounting plates;

lateral guide means on said mounting plates for lateral alignment of said mold tool, said lateral guide means having guide surfaces which converge towards the respective mounting plate and towards a centre line thereof and which are adapte to co-operate with side edges of the mold tool whereby, when said movable mounting plate is moved from a spaced-apart condition of said mounting plates for freely receiving said mold tool therebetween towards the other mounting plate, each said mold tool portion is displaceable on said respective guide surface of said support means towards said respective mounting plate with said lateral guide surfaces providing for precise lateral alignment of said mold tool portions with said mounting plates;

means for fixing said respective mold tool portions on said respective mounting plates;

connector means on said mold tool and said machine, said connector means on said mold tool and said connector means on said machine adapted to be coupled together in the operation of fitting said mold tool on said machine to provide operational communication between said mold tool and said machine; and a mold tool carriage adapted to be moved to said injection molding machine in lateral relationship therewith and having a surface for displaceably supporting said mold tool and a pushing means for pushing said mold tool into a position between said mounting plates from the side of said machine, wherein the surface of said tool carriage comprises first and second mutually parallel rails adapted to co-operate with edges of said mold tool, said first rail being associated with one of mounting plates and said second rail being displaceable in a transverse direction with respect to said first rail.

10. An arrangement as set forth in claim 9 wherein said molding machine has guide members extending between said mounting plates adjacent at least the lower edges of said mounting plates and adapted to guide said movable mounting plate in its movement relative to the other, and wherein said guide surface of each said support means is disposed at a higher level than said guide members.

11. An arrangement as set forth in claim 9 wherein the structure of said tool carriage providing said mold tool displacement surface is pivotable through 180° about a vertical axis and has first and second locations for accommodating respective tools.

12. An arrangement as set forth in claim 9 wherein said rails and said guide surfaces of said support means have a friction-reducing low-wear coating thereon.

13. An arrangement as set forth in claim 9 wherein said rails have free ends providing means for locating said rails relative to said injection molding machine.

14. An arrangement as set forth in claim 13 wherein said locating means are adapted to engage with support locations on said machine thereby to provide support for said free ends of said rails.

* * * * *